Dec. 15, 1959     M. N. NESTOROVIC     2,917,031
INTERNAL COMBUSTION ENGINE
Filed July 24, 1956     4 Sheets-Sheet 1

INVENTOR
MIROSLAV NESTOROVIC

BY *Dicke and Craig*

ATTORNEYS.

Dec. 15, 1959       M. N. NESTOROVIC       2,917,031
INTERNAL COMBUSTION ENGINE
Filed July 24, 1956       4 Sheets-Sheet 2

INVENTOR
MIROSLAV NESTOROVIC
BY Dieke and Craig.
ATTORNEYS.

Dec. 15, 1959     M. N. NESTOROVIC     2,917,031
INTERNAL COMBUSTION ENGINE Filed July 24, 1956     4 Sheets-Sheet 3

INVENTOR
MIROSLAV NESTOROVIC

BY *Deeke and Cruig*

ATTORNEYS.

Dec. 15, 1959  M. N. NESTOROVIC  2,917,031
INTERNAL COMBUSTION ENGINE
Filed July 24, 1956  4 Sheets-Sheet 4

INVENTOR
MIROSLAV NESTOROVIC

BY *Dicke and Craig*

ATTORNEYS.

United States Patent Office 2,917,031
Patented Dec. 15, 1959

2,917,031

INTERNAL COMBUSTION ENGINE

Miroslav Nikola Nestorovic, Belgrade-Obilicev, Yugoslavia

Application July 24, 1956, Serial No. 599,813

Claims priority, application Great Britain August 2, 1955

27 Claims. (Cl. 123—32)

The present invention relates to a piston-type internal combustion engine which consists of at least one cylinder provided with a piston as well as of means for introducing or supplying primary combustion air, fuel and highly compressed combustion air into the cylinder.

The present invention aims at an improvement of the internal combustion engine, especially for the drive of streetcars and rail cars which, on the one hand, is so flexible that for purposes of drive for the vehicle the provision of a change-speed transmission is obviated, and which, on the other, exhibits considerable improvements as regards the thermal efficiency of the internal combustion engine as a result of the novel combustion process in accordance with the present invention.

These improvements are attained in accordance with the present invention in that at least a part of the combustion air available for ignition or combustion which is present in the cylinder at the beginning of the compression stroke of the piston, the remainder of the primary air being expelled in any suitable manner, is compressed, while toward the end of this compression stroke a part of the fuel is introduced or injected into the thus compressed primary air and is ignited due to the heat produced by the compression. The fuel thereby burns with the compressed primary air at an essentially constant volume, and following this highly compressed air from the compressor and the main part of the fuel, is introduced into the cylinder at an essentially constant ratio with respect to each other over a larger part of the following stroke of the piston during the combustion in such a manner that the main portion of the fuel burns at approximately constant pressure and constant temperature.

A further characteristic feature of the present invention consists in that the pressure in the cylinder at the end of the combustion at a constant volume as well as also with a combustion at constant pressure and irrespective of the degree of filling has always essentially the same value.

In known diesel combustion engines the same amount of air is always compressed so that the amount of filling or charge in the combustion chamber can only be increased by an increase in the injection fuel quantity. As a result thereof, the ratio of air to fuel becomes smaller and the temperature rises with relatively larger amounts of filling or charges so that the largest filling or fuel-air charge can only take place if the ratio of air to fuel is 14:1. However, in a combustion engine according to the present invention the air-fuel ratio remains always essentially the same during the combustion which takes place at constant pressure, and in a combustion engine with a compression ratio of $\epsilon=18$ a maximum combustion pressure of $p_a=70$ as well as an excess-air coefficient of $\lambda=1.4$ is obtained so that the greatest possible degree of filling or charge over 27.3% of the piston stroke takes place in contrast to a diesel combustion engine of well-known construction having similar values or parameters in which the greatest filling or charge occupies only 4.3% of the piston stroke.

The temperature at the end of the combustion is always constant. By reason of the fact that the filling or charge in the combustion engine may be 6.4 times larger as with the ordinary diesel combustion engine the present invention provides an internal combustion engine which produces a greater output at full rotational speed and the load characteristic of which corresponds essentially to that of a steam engine which provides a great pulling force without transmission whereby solely a hydraulic coupling is to be provided between the internal combustion engine and the driven part of the vehicle.

Further features, objects and advantages of the present invention will become more obvious from the following description when taken in connection with the accompanying drawing which shows, for purposes of illustration only, one embodiment in accordance with the present invention, and wherein.

Figure 1A:
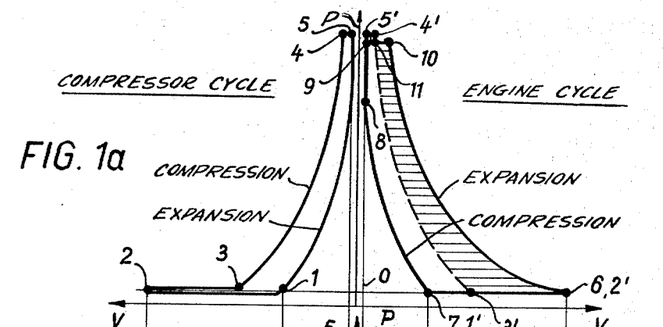
Figures 1a, 1b and 1c are pv-diagrams of an internal combustion engine according to the present invention with a relatively small, medium and maximum degree of filling or charge of the engine respectively.

Referring now to the drawing which shows for purposes of illustration one preferred embodiment in accordance with the present invention and wherein like reference numerals are used throughout the various views to designate like parts, and more particularly to Figure 1a, the pv-diagram thereof shows the operating cycle during a combustion process with a relatively small degree of filling or charge. This small degree of filling or charge as shown in Figure 1a, corresponds to a small fuel-air charge of the engine.

The left side of the diagram of Figure 1a shows the pv-diagram for the compressor and the right hand side thereof the pv-diagram for the working cylinder of the internal combustion engine. The piston of the compressor draws in air through an inlet valve into the compressor cylinder between the points 1 and 2 when the compressor piston moves outwardly, i.e. during the suction stroke thereof, while during the movement of the compressor piston in the opposite direction, i.e. during the compression stroke, the inlet valve of the compressor remains open between points 2 and 3 and thereby permits the escape of a part of the drawn-in quantity of air out of the cylinder. At point 3, the inlet valve is closed and the remainder of the air remaining in the cylinder of the compressor is compressed between the points 3 and 4. Between the points 4 and 5 the compressed air is conducted into the working cylinder of the combustion engine. The total energy used in the compressor is thereby represented by the area 1, 2, 3, 4, 5, 1.

A 2-cycle internal combustion engine forms the basis for the pv-diagram of the working cylinder, illustrated on the right side of Figure 1a, which operates with uniflow scavenging and which is provided with control slots in the cylinder controlled by the working piston as well as with an outlet valve. The scavenging air which, for example, is compressed by a pump driven by the crankshaft, flows into the working cylinder in the bottom dead center position of the piston, forms with a partial filling of the cylinder a rotating air cushion, and simultaneously displaces a part of the exhaust gases therefrom. The remainder of the exhaust gases are displaced by the air cushion during the upward movement of the piston, i.e., during the compression stroke, from the point 6 to point 7 out of the cylinder whereby simultaneously therewith a part of the scavenging air is expelled and thereby cools the valve and the valve seat thereof. The outlet valve closes at point 7 and the quantity of air which remains trapped in the cylinder of the internal combustion engine is compressed up to the point 8. The compression ratio is thereby selected so large that the end temperature of the compressed air is capable to ignite the injected fuel, as is usual in connection with ordinary diesel combustion processes. At the point 8 the fuel is injected into the cylinder, and while the piston of the internal combustion engine is in the upper dead center position, the fuel burns with a constant volume up to the point 9. At the point 9, additional fuel and the combustion air compressed by the compressor are separately introduced into the cylinder and burn therein at a constant air-fuel ratio, at a constant temperature and at a constant pressure up to the point 10. The air which is compressed by the compressor is able to enter the working cylinder between the points 9 and 10 as the pressure thereof is slightly higher than the pressure in the working cylinder. At point 10 the supply of fuel and air into the working cylinder is interrupted and the combustion process is terminated. The combustion gases expand from point 10 to point 6. The work produced by the working cylinder is indicated in the diagram by the area 6, 7, 8, 9, 10, 6.

The described combustion in the working cylinder can also be applied to internal combustion engines which operate as four-cycle engines. In such four-cycle engines the exhaust gases are expelled, after completion of the expansion at point 6, between the points 6 and 0 through the outlet valve, and during the return movement or compression stroke of the piston between points 0 and 6 fresh air is drawn in through the inlet valve, whereby a part of the drawn-in air is expelled thereupon through the open inlet valve up to the point 7 by the piston, as in the case of internal combustion engines of the two-cycle type. The inlet valve closes at point 7 and compression takes place up to the point 8 whereupon the combustion process takes place as described hereinabove in connection with the two-cycle engine. Such an arrangement enables a good internal cooling of the piston and of the cylinder head even at higher rotational speeds of the internal combustion engine.

The work to be done by the compressor indicated by the area 1, 2, 3, 4, 5, 1 on the left side of the diagram of Figure 1a corresponds to the area 1', 2', 3', 4', 5', 1' of the right hand side of the diagram whereby the available work of the internal combustion engine is obtained by subtracting the working surface 1', 2', 3', 4', 5', 1' of the compressor from the working surface 6, 7, 8, 9, 10, 6 of the working cylinder. If it is assumed that the point 1' coincides with the point 7 and if the small area 9, 5', 4', 11 of the increased pressure of the highly compressed air which is necessary to overcome the flow losses in the system, then an available work will result which is indicated by the area defined by points 6, 3', 11, 10 and 6 of the diagram.

This area 6, 3', 11, 10, 6 with a small amount of filling or charge is equal to the working area which is obtained in the Joule-cycle process. This represents one extreme case of the process or method in accordance with the present invention.

The difference between the proposed method and the Joule-cycle process resides in that in the proposed method the combustion takes place at first at constant volume and thereupon takes place, as in the ordinary diesel combustion process, at constant pressure, whereas in the Joule cycle the combustion of the fuel takes place solely at constant pressure.

Figure 1B:
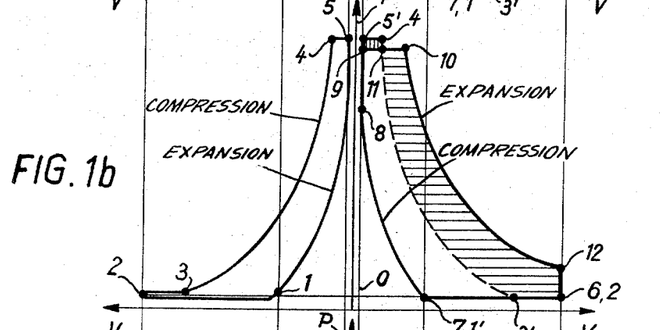

Figure 1b shows a pv-diagram for a medium degree of filling or charge. The difference with respect to the process indicated in Figure 1a consists in that the inlet valve of the compressor closes sooner during the compression stroke so that a larger amount of air is compressed and the interruption of the fuel and air supply during the working stroke of the piston of the internal combustion engine is delayed, as will be described more fully hereinafter, so that a larger quantity of air and fuel reaches the engine. The expansion of the combustion gases thereby takes place from point 10 to point 12, whereupon the outlet valve is opened and the gas pressure falls or drops to the point 6. The available working area of this cycle 6, 3', 11, 10, 12, 6 is larger than the corresponding available working area according to Figure 1a.

Figure 1C:
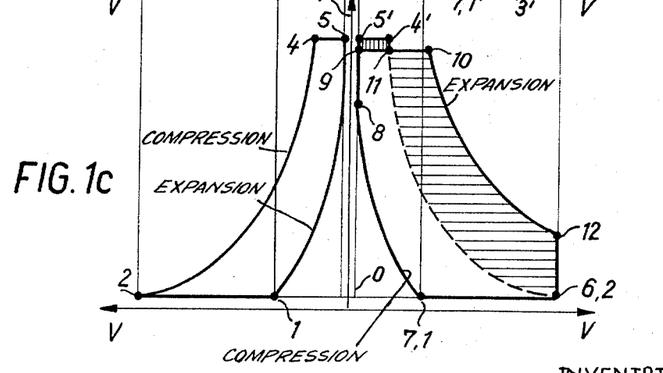

Figure 1c shows a pv-diagram with a maximum degree of filling. The inlet valve of the compressor is closed at point 2 in order to obtain the largest possible amount of highly compressed air, and the cut-off of the fuel and air supply during the working stroke of the piston of the internal combustion engine is further delayed than is done in connection with Figure 1b. The available work represented by the area 6, 11, 10, 12, 6 according to Figure 1c is larger than that according to Figure 1b and is equal to the available work of the classical diesel-cycle process and represents the second extreme case of a process in accordance with the present invention.

The difference between these two cycles lies in that according to the process of the present invention the combustion of the fuel takes place at constant volume and constant pressure whereas in the classical diesel-process the combustion takes place solely at constant pressure. Furthermore, the temperature increases in the Joule and diesel processes with an increase in the degree of filling or charge whereas with the process according to the present invention the temperature during combustion at constant pressure remains the same as the air-fuel ratio always remains the same.

In the three cases illustrated in Figures 1a, 1b and 1c the maximum combustion pressure always remains the same, and more particularly is independent of the degree of filling.

Compressors of any known construction may be used for purposes of compressing the air. Such compressors may be driven either directly from the crankshaft of the internal combustion engine or through an auxiliary motor, an exhaust gas turbine or any other source of power. Furthermore, such compressors may form different combinations, for example, the first or the first and second stages of the compressor may be a turbo-compressor driven by an exhaust turbine, while the second and third or third stage of the compressor may be driven directly from the crankshaft, etc.

The working cylinders of the internal combustion engine operate as mentioned above either as two-cycle or four-cycle engines and gasoline, petroleum or diesel oil may be used as fuel.

Figure 2:
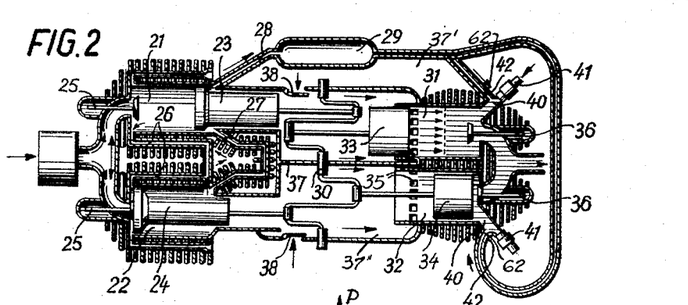
Figure 2 is a schematic representation of one embodiment of a 2-cycle internal combustion engine in accordance with the present invention.

The internal combustion engine schematically indicated in Figure 2 is an opposed cylinder-type engine which comprises two compressor cylinders, 21, 22 with double-acting differential pistons 23 and 24 which operate as a three-stage compressor. The air is drawn into the cylinders 21 and 22 through the valves 25 during the inward movement or expansion stroke of the pistons 23 and 24 so that the stroke volume or piston displacement of both cylinders represents the first stage of compression.

The air is compressed during the movement in the opposite direction of pistons 23 and 24, i.e., during the compression stroke thereof, and is conducted or fed into the cylinder 22 over the lines 26 which are provided with cooling fins effective as air coolers between the first and second stages of compression, and more particularly are conducted or fed behind the piston 24.

In the second compressor stage the air is compressed during the next outward stroke of the piston 24, i.e., during the next normally designated expansion stroke of piston 24, as viewed in Figure 2, and thereafter is supplied over an air cooler disposed between the second and third compressor stage into the cylinder 21 behind the piston 23 thereof. In the third compressor stage the air is compressed in the cylinder 21 during the next outward stroke of the piston 23, i.e., during the next stroke of piston 23 toward the right as viewed in Figure 2, and is thereby forced through the line 28 into an air storage tank 29. The valves ordinarily necessary between the three compressing stages have not been indicated in the drawing for clarity's sake. However, such valves may be of any suitable well known construction. The valves 25 in the cylinders 21 and 22 are actuated in any well known manner (not shown in the drawing), for example, by any mechanical or automatically operative means of any suitable type.

In the embodiment according to the present invention shown in Figure 2, the compressor pistons 23 and 24 are driven by the crankshaft 30 of a two-cycle internal combustion engine which is provided with working cylinders 31 and 32 and pistons 33 and 34. The cylinders 31 and 32 are arranged at the crankshaft opposite the cylinders 21 and 22. The cylinders 31 and 32 are provided wtih scavenging slots 35 and outlet valves 36 permits a uni-flow scavenging in the cylinder.

The crankcase is separated into two parts by a wall 37, whereby each of these two parts is provided with oppositely arranged compressor and working pistons which operate in directional synchronism, that is, the compressor piston and the working piston move outwardly at the same time and vice versa. The scavenging air is drawn in through valves 38 (schematically illustrated in Figure 2) into one of the crankshaft spaces 37' or 37" during the outward or compression stroke of both pistons and is compressed during the inward or expansion stroke of the pistons 23, 33 or 24, 34 respectively and is conducted around the respective cylinder 31 or 32 and fed thereupon through the respective scavenging slots 35. The quantity of scavenging air which is drawn into the crankcase 37', 37" is twice as large as in known two-cycle internal combustion engines whereby an effective scavenging is made possible even with a shorter opening of the inlet apertures, and an internal cooling of the inlet valve, of the piston and of the cylinder head even at higher rotational speeds of the internal combustion engines is thereby made feasible.

Each of the cylinders 31 and 32 is provided with a small conical combustion chamber 40 having an injection nozzle 41 at the inner end of the inlet valve 42 for the compressed air supplied from the reservoir or tank 29. The orifice of the valve 42 lies closely adjacent to the injection nozzle 41 and terminates or discharges tangentially into the combustion chamber 40.

Figure 3:
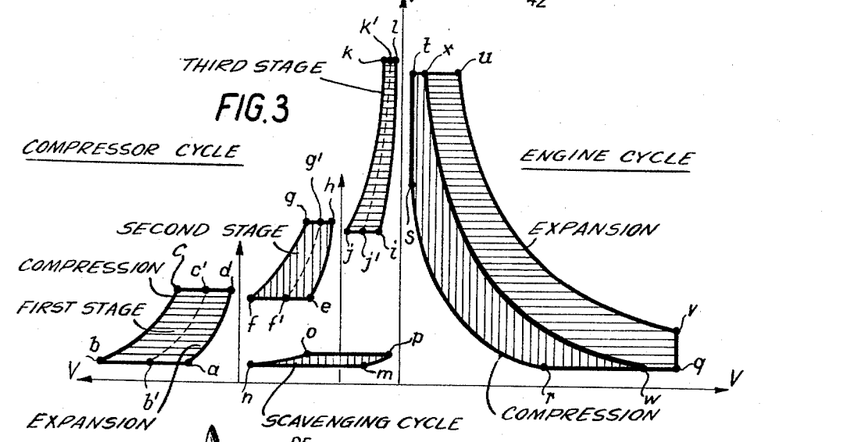
Figure 3 is a pv-diagram of the thermodynamic cycle of the combustion process in a combustion engine according to Figure 2.

The characteristic pv-diagram of the internal combustion engine described in connection with Figure 2 is illustrated in Figure 3. If the internal combustion engine is operated at a high degree of filling or with a large charge, then the area $a, b, c, d, a$ represent the amount of work required for the first compression stage, the area $e, f, g, h, e$ that for the second compression stage, the area $i, j, k, l, i$ that for the third compression stage, the area $m, n, o, p, n$ the work required for the crank case pump and the area $q, r, s, t, u, v, q$ the work done by the working cylinders.

If the internal combustion engine is operated with a small degree of filling, then the corresponding area $a, b, c', d', a$ the corresponding area $e, f', g', h, e$, the corresponding area $i, j', k', l, i$, the corresponding area $m, n, o, p, m$, and the corresponding area $w, r, s, t, x, w$ will result therefrom. In both of the aforementioned working cycles the available work is equal to the output of the working cylinder reduced by the amount of energy necessary for the three stage compressor and the crank case pump.

Figures 4, 6:
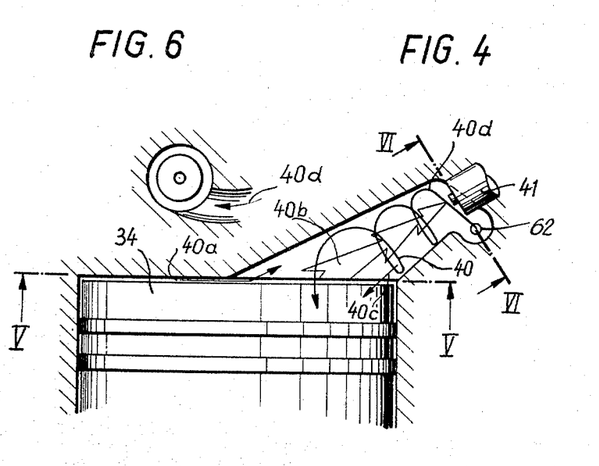
Figure 4 is a central longitudinal cross sectional view through the combustion space of the working cylinder.
Figure 6 is a cross sectional view taken along line VI—VI of Figure 4.
Figure 5:
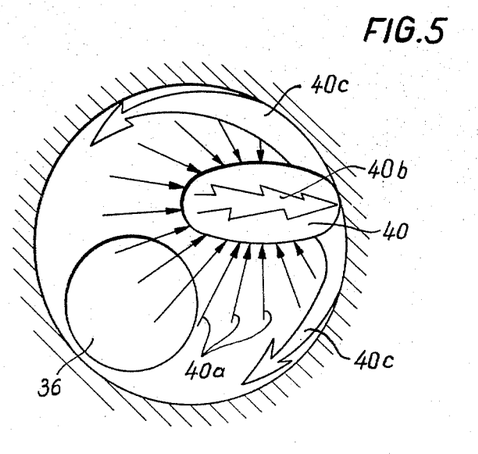
Figure 5 is a cross sectional view taken along line V—V of Figure 4.

The details of the combustion chamber 40 are shown in Figures 4, 5 and 6. At the end of the outward movement or compression stroke of the piston the air flows out of the cylinder, such as for example, out of cylinder 32, into the combustion chamber 40 where after ignition of the fuel the combustion takes place.

The combustion chamber 40 is arranged eccentrically with respect to the cylinder axis so that a portion 40a of the compressed air flows over into the chamber 40 in a direction opposite to the direction of injection of the fuel 40b. A portion of the air flows laterally and with a high velocity transversely to the orifice of the combustion space 40. As a result thereof an intimate mixing of air and fuel will be achieved and, which is an important feature, the combustion gases 40c are displaced out of the combustion space into the cylinder. After the ignition of the initially injected fuel a further amount of fuel 40b and of high compressed air 40c are introduced tangentially into combustion chamber 40 whereby intimate mixing of fuel and air is achieved and the burned gases are displaced or expelled therefrom.

As clearly indicated in Figure 6 the highly compressed air is introduced into the combustion chamber 40 tangentially whereby an intimate mixing of fuel and air is attained.

However, it is preferable that the combustion chamber is not arranged too far outside of the center or eccentrically in order to avoid an excessive flow of the combustion gases along the cylinder walls and too large a transfer of heat to the same.

Figures 7, 9:
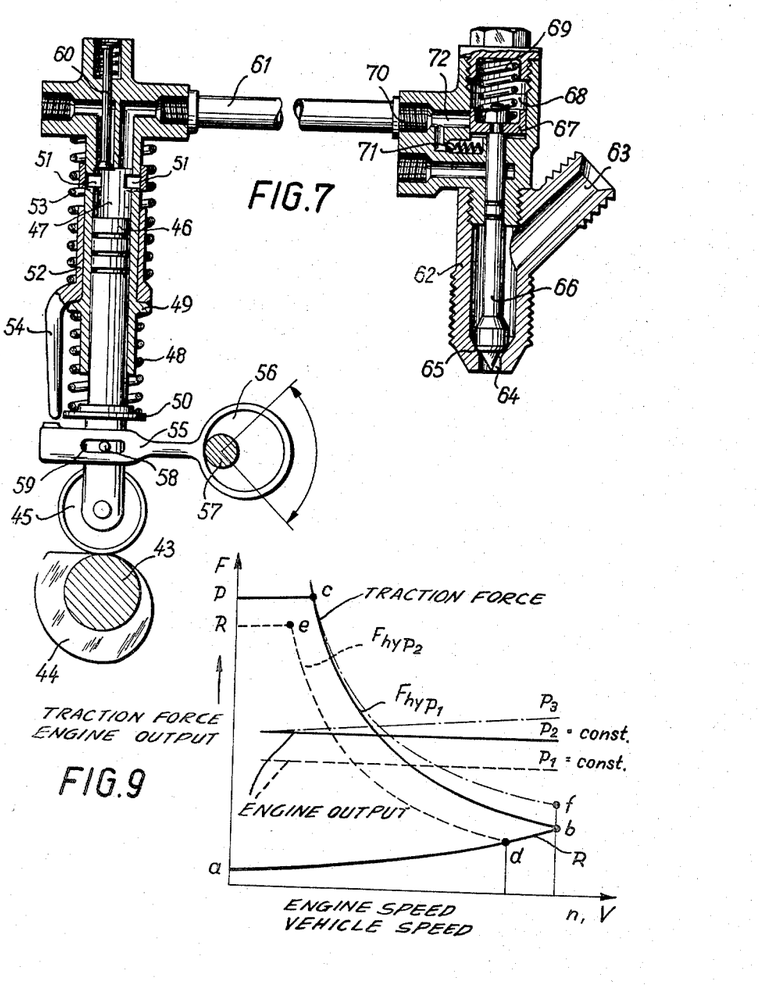
Figure 7 is a cross sectional view through the valve control arrangement for controlling the air supply to the working cylinder.
Figure 9 is a diagram indicating the pulling force or torque developed by an internal combustion engine in accordance with the present invention.

The control mechanism for the feed of the compressed air into chamber 40 is shown in detail in Figure 7. The cam shaft 43 which rotates at the same speed as the crankshaft is provided with a cam 44 and with a roller 45 cooperating with the cam 44. The roller 45 which moves upwardly and downwardly as it follows the cam surface controls a piston 46 which reciprocates or slides in cylinder 47. The roller 45 is forced against the cam 44 by means of a spring 48, which is arranged between a flange 49 provided at the cylinder 47 and the collar 50 provided at the piston 46. The cylinder 47 is provided with outlet apertures 51 which are controlled by means of a sleeve 52 which slides along the outside of the cylinder 47. The sleeve 52 is normally pressed against flange 49 by spring 53 so that it abuts against the flange 49 in which position the apertures 51 are closed. The sleeve 52 is provided with a nose-like projection 54 the lower end of which is disposed at a distance from the free end of the lever arm 55. The lever 55 is pivotally supported about a disk 56 mounted eccentrically on shaft 57 and is connected for common movement with the piston 46 by means of a pin member 58 which extends through the elongated slot 59 provided at one end of the lever 55. The vertical or axial movement of the piston 46 thereby produces a pivotal movement of the arm 55 about the eccentric disk 56. The distance between the lower end of the nose-like projection 54 and the free end of the lever 55 may be adjusted by rotation of the shaft 57. The fluid medium is drawn into the cylinder through an inlet valve 60 during the downward movement or expansion stroke of the piston 46 and is supplied under pressure during the upward movement or compression stroke of the piston 46 through a line or conduit 61 to an air valve. At a given time during this upward movement the lever 55 abuts against the nose-like projection 54 and therewith lifts the sleeve 52 while compressing the spring 53. As a result thereof the apertures or slots 51 are opened or exposed to the atmosphere and the pressure of the fluid medium in line 61 drops. The time delay between the movement of the piston 46 and the sleeve 52 depends on the distance between the nose-like projection 54 and the lever 55 so that the time during which the air valve is opened, which is only actuated if the fluid medium is under a predetermined pressure, may be adjusted to any desirable value.

The air valve unit consists of a hollow body 62 which is in communication through an inlet opening 63 with the compressed air source, such as the reservoir or tank 29 illustrated in Figure 2. An outlet aperture 64 is normally closed by means of a seat 65 of valve 66. The valve shaft of valve 66 is slidably supported in the hollow body 62 and is provided at the upper end thereof with a piston 67 which slides in a cylinder 68. A spring 69 normally urges the piston 67 and therewith the valve 66 downwardly so that the valve 66 normally closes the outlet aperture 64. The line or conduit 61 is connected with an inlet aperture 70 and is in communication with the lower end of the cylinder 68 over a one-way inlet valve 71 so that the fluid medium under pressure when forced through the one-way inlet valve 71 will tend to lift the piston 67 and therewith the valve 66.

A pressure line 72 which discharges into the side wall of the cylinder 68 along the lower end thereof is in communication with the aperture 70 and forms a by-pass line for the inlet valve 71. The line 72 is normally closed by the piston 67 in the lowermost position thereof. The valve 66 is normally closed and is opened by the upward movement of the piston 67 as seen in Figure 7. During operation the fluid medium is supplied from piston 46 through the conduit 61, the aperture 70, and the valve 71 into the lower part of the cylinder 68 so that the piston 67 is lifted against the force of the spring 69 and the valve 66 is opened simultaneously therewith. After relieving or reducing the pressure of the fluid medium in the conduit 61 the fluid medium flows back through the line 72, and the spring 69 pushes the piston 67 down again in order to close again the valve 66. In order to avoid a hard impact of the valve 66 on the valve seat 65 at the end of the piston movement the fluid medium is forced to leave the cylinder 68 through a small aperture 73 between the line 72 and the cylinder 68 after the line 72 and the inlet valve 71 are closed. It should be noted that the masses of the valve control mechanism of Figure 7 which are to be moved are very small and as a result thereof very short period for opening the valve 66 may be achieved.

The fluid medium for the actuation of the air valve may be, for example, the regular fuel for the internal combustion engine if it possesses appropriate viscosity and lubricating characteristics. The fuel always flows back into the fuel tank or reservoir and as a result of this circulatory cycle its cooling is assured. Furthermore, the regular fuel will not freeze under temperatures which may be expected under normal operating conditions. However, it is understood that any other suitable fluid medium may be used.

The mechanism illustrated in the drawing may also be used for the control of the other valves. However, it is understood that other arrangements may also be used which operate mechanically, hydraulically or pneumatically.

The output control of the internal combustion engine is regulated, on the one hand, by the adjustment of the air quantity compressed in the air compressor and, on the other, by the quantity of fuel as well as of pressurized air supplied or introduced into the cylinder. The control arrangement, especially in connection with motor vehicles, as regards the output of the combustion engine may be regulated by a foot pedal in such a manner that with a given position of the foot pedal it remains constant over the entire speed range of the vehicle, i.e., remains constant over the entire range of rotational speeds of the internal combustion engine. The control is so arranged that the average effective pressure of the combustion gases in the working cylinder decreases with increasing rotary speed of the engine and vice versa. Consequently, upon fully depressing the foot pedal, the largest output which remains constant may be achieved. It corresponds to the required output to overcome the largest resistance due to an incline or the resistance at the greatest velocity, however, those resistances which are smaller than the aforementioned output on a level road at a velocity other than maximum velocity, have been ignored.

Figure 9 illustrates the pulling force or traction diagram of a motor vehicle. The curve $a$—$b$ represents the resistance R to movement of the vehicle on a level road. The curve $b$—$c$ represents the hyperbola of the largest traction force $F_{hyp1}$ which corresponds to a constant motor output $P_1$=constant. It follows from the foregoing that the output necessary to overcome the largest pulling or traction forces are to remain constant over the entire velocity range or rotational speed range in motor vehicles.

With a smaller depression of the gas pedal the output of the engine becomes smaller but even then it is to remain constant over the entire speed range, i.e., $P_2$=constant. In that case the pulling or traction force becomes smaller and corresponds to the hyperbola from point $d$ to $e$. In connection therewith, the maximum speed of the vehicle on a level road becomes smaller than in the preceding case and the vehicle can overcome smaller maximum inclines with smaller velocities.

With a constant output the heat produced by the internal combustion engine which must be dissipated or carried off by the cooling medium must remain constant. If the velocity of the vehicle decreases with an increasing resistance to movement then the drive of the blower of an air cooling arrangement or of the ventilator and of the cooling water pump, in case of a liquid cooling system, cannot take place directly from the crankshaft of the internal combustion engine but has to be accelerated with respect to the speed of the engine and vice versa, i.e., has to be driven inversely proportional to the rotary speed of the internal combustion engine.

Figure 8:
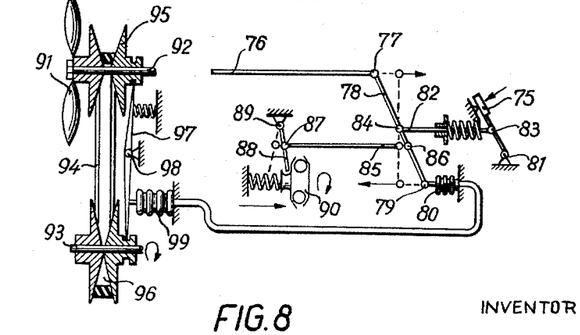
Figure 8 is an arrangement for controlling the output of the internal combustion engine.

Figure 8 shows an arrangement for controlling the output of the internal combustion engine in dependence on the position of the foot pedal 75. A rod 76, which controls the supply of fuel and air as well as the compressed air supplied by the compressor, is pivotally connected at 77 to one end of a lever 78. The other end of a lever 78 is pivotally connected to the actuating rod of a pressure responsive device 80 such as a servo mechanism or the like. The foot pedal 75 is pivotally secured at 81 to the frame of the vehicle and a rod 82 is articulately connected at one end 83 thereof with the foot pedal 75 and at the other end 84 thereof with the center of the lever 78.

One end of the rod 85 is pivotally connected at 86 with the lever 78 intermediate the points 79 and 84 and the other end of the rod 85 is pivotally connected with a lever 88 at 87. The lever 88 is pivotally supported at the frame of the vehicle at joint 89. A speed responsive adjustment means 90 is operatively connected with the free end of the lever 88 and is operative during a change of the rotational speed of the internal combustion engine to bring about pivotal movement of the lever 88 and therewith an axial movement of the rod 85.

A blower or ventilator 91 which serves for purposes of cooling the internal combustion engine is secured to a shaft 92 and is driven by another shaft 93 by means of cone or V belt 94 passing over adjustable pulleys 95 and 96. Each of the two adjustable pulleys 95 and 96 consists of two conically shaped parts of which one is rigidly secured to the respective shaft 92 or 93 and the other is slidingly arranged thereon. A lever 97 is pivotally supported at 98 on the frame of the vehicle and with both free ends thereof engages grooves which are provided in the adjustable conical parts of both pulleys 95 and 96. An angular movement of lever 97 about its pivoting axis effects opposite changes in the distance between the respective conical parts of pulleys 95 and 96 whereby the effective diameter of each of the pulleys 95 and 96 accommodating the V belt 94 is changed in opposite sense, i.e., one becomes larger while the other one becomes smaller and vice versa. The adjustment of the lever 97 is controlled by a pressure responsive device 99 which is interconnected with the pressure responsive device 80 and forms a counterpart therefor. Any suitable type of servo mechanism may be used for the adjustment of lever 97.

If, for example, the foot pedal 75 is fully depressed and the vehicle is thereby accelerated, then with an increase in rotational speed of the speed responsive device 90, the lever 78 is pivoted about the point of pivotal support 84 thereof. As a result of the movement of the lever 78 the rod 76 is displaced correspondingly which results in a decrease in the filling or charge of the working cylinder whereby simultaneously the pressure responsive device 80, such as a bellows or pressure box, is actuated in such a manner as to produce an adjustment of the lever 97 by the pressure responsive device 99 to thereby effect a decrease in the rotational speed of the blower or ventilator 91.

This control of the internal combustion engine may also be made in such a manner that the output increases with increases in the rotational speed thereof, either over the entire or over a part of the rotational speed range. In that case the output will correspond to the curve $P_3$ (Figure 9) and the pulling or traction forces correspond to the curve c—f. Such a control is particularly of interest in engines used for locomotives as the pulling forces are greater within the range of higher speeds or velocities. Such an arrangement permits that the train may attain the maximum speed even with larger resistances to movement or with a larger number of cars. In such a case the filling or charge of the engine or the average effective pressure does not decrease with an increase in the speed of the engine so that the output remains constant but takes place according to a curve in such a manner that the filling at full speed is greater than in the preceding case.

Also in this case the control arrangement may be the same as illustrated in Figure 8 only with the difference that the joint 89 is displaced toward the right so that the lever 88 forms an angle of essentially 90 degrees with the lever 85 during standstill of the engine. As a result thereof, the approximately proportional axial displacement of the free end of the adjusting means with respect to the rotational speed of the engine is not transmitted proportionally to the lever system 85, 78 and 76 but more according to a sinusoidal curve. With a decrease in the number of rotations of the engine the average effective pressure will also decrease according to a sinusoidal curve and the output with an increasing rotational speed will increase according to the same curve.

All other things and conditions remaining the same i.e., with the working stroke, speed of rotation, maximum combustion pressure remaining the same, the output of the engine according to the present invention may be considerably larger than compared to those of known cycles. The increase of the specific output of the engine is achieved only through increase of the filling which is not possible in connection with other cycles, the limit of the amount of filling, however, determining the thermal load of the materials and the possibility of cooling the thermally loaded engine parts. As, however, in the workwhile only the remainder of said primary combustion air ing cylinder the entire working volume is used to draw in air and since thereafter a large part of this drawn-in air is again expelled, this air dissipates a large part of the heat and, therefore, cools the walls especially of those parts which are thermally loaded the highest. As a result thereof such an engine is also provided, in addition to the external cooling system, with an internal cooling system which is more effective than the external cooling system as no heat losses are present as a result of transfer of heat through the walls of the engine parts. For these reasons the internal combustion engine according to the present invention is not only suitable for motor vehicles but also for shipboard and stationary engines especially if the drive of the compressor and more particularly the first and second stage thereof takes place by an exhaust gas-turbine while only the third compressor stage is driven by the engine.

While I have shown and described one preferred embodiment in accordance with the present invention, it is understood that the same is not limited thereto but is susceptible of many changes and modifications within the spirit of the present invention and I intend to cover all such changes and modifications except as defined in the appended claims.

I claim:

1. An internal combustion engine comprising at least one working cylinder, a piston in said working cylinder, means for supplying to said cylinder primary combustion air for compression at least in part during the compression stroke of said piston, means for injecting a portion of the fuel charge at the end of said compression stroke for ignition with the heated compressed primary combustion air part whereby said portion of the injected fuel charge burns at essentially constant volume, and means for supplying thereafter highly compressed air to said cylinder while simultaneously therewith injecting the main fuel charge into said cylinder at an essentially constant predetermined ratio of highly compressed air to main fuel charge over a larger portion of the following piston stroke during the combustion so as to burn the main part of the fuel at essentially constant pressure and at essentially constant temperature.

2. An internal combustion engine comprising at least one working cylinder, a piston in said working cylinder, means for supplying to said cylinder primary combustion air for compression at least in part during the compression stroke of said piston, the other part being expelled during said compression stroke, means for injecting a portion of the fuel charge at the end of said compression stroke for ignition with the heated compressed primary combustion air part whereby said portion of the injected fuel charge burns at essentially constant volume, and means for supplying thereafter highly compressed air to said cylinder while simultaneously therewith injecting the main fuel charge into said cylinder at an essentially constant ratio of highly compressed air to main fuel charge over a larger portion of the following piston stroke during the combustion so as to burn the main part of the fuel at essentially constant pressure and at essentially constant temperature, the end combustion pressure in the cylinder of said engine being of essentially the same magnitude with every degree of filling during the combustion at constant volume as well as during the combustion at constant pressure.

3. An internal combustion engine according to claim 1, wherein said engine is a two-cycle engine including an outlet valve for said cylinder and means for actuating said outlet valve to open the same to enable discharge from said cylinder of the burnt gases, said last-mentioned means being operative to open said valve also during a part of said compression stroke so as to enable expulsion of a part of said primary combustion air supplied by said first-mentioned means with simultaneous internal cooling of said valve and the surrounding parts thereof forming said first-mentioned part thereof is compressed by said piston.

4. An internal combustion engine according to claim 1, wherein said engine is a four-cycle engine including an outlet valve for the discharge of the burnt gases, and wherein said first-mentioned means includes an inlet valve and means for controlling said inlet valve to keep the same open also during a part of said compression stroke so as to enable expulsion of a part of said primary combustion air with simultaneous internal cooling of said piston and cylinder head while only the remainder of said primary combustion air forming said first-mentioned part thereof is compressed by said piston.

5. An internal combustion engine according to claim 1, wherein the beginning of compression of said part of primary combustion air by said piston in said cylinder takes place at the same crankshaft angle with all loads whereby the amount of compressed primary combustion air remains constant.

6. An internal combustion engine according to claim 1, further comprising means for adjusting the output of said engine at constant speed solely by adjusting the total amount of said main fuel charge and of said highly compressed air at said ratio supplied during the working stroke of said piston.

7. An internal combustion engine according to claim 6, wherein said last-mentioned means is operative to adjust said total amount by changing the moment during said working stroke at which the supply of said main charge of the fuel and of said highly compressed air is interrupted.

8. An internal combustion engine adapted to operate at different outputs depending on the adjustment of the output control means therefor comprising at least one working cylinder, a piston in said working cylinder, means for supplying to said cylinder primary combustion air for compression at least in part during the compression stroke of said piston, means for injecting a portion of the fuel charge at the end of said compression stroke for ignition with the heated compressed primary combustion air part whereby said portion of the injected fuel charge burns at essentially constant volume, means including compressor means for supplying thereafter highly compressed air to said cylinder while simultaneously therewith injecting the main fuel charge into said cylinder at an essentially constant ratio of highly compressed air to main fuel charge over a larger portion of the following piston stroke during the combustion of said part of the fuel so as to burn the main part of the fuel at essentially constant pressure and at essentially constant temperature, and control means for controlling the amount of air drawn in by said compressor means and the energy necessitated thereby in correspondence with the adjustment of the said output control means for said engine.

9. An internal combustion engine according to claim 8, wherein said compressor means is a multi-stage compressor and comprises a single source of power for driving said multi-stage compressor.

10. An internal combustion engine according to claim 9, wherein said multi-stage compressor includes two cylinders each provided with one piston, both pistons being driven by the crankshaft of the engine, the first stage of said compressor being formed by the space forwardly of each piston and the corresponding cylinder, the second stage being formed by the space in one of said cylinders rearwardly of the corresponding piston and the third stage being formed by the space in the other of said cylinders rearwardly of the corresponding piston, and means interconnecting said spaces to provide a three-stage compressor.

11. An internal combustion engine according to claim 8, wherein said compressor means is a multi-stage compressor, and a plurality of sources of power including the crankshaft of the engine and turbine means driven by the exhaust gases of the engine to drive the various stages of said compressor.

12. An internal combustion engine comprising at least one working cylinder, a piston in said working cylinder, means for supplying to said cylinder primary combustion air for compression at least in part during the compression stroke of said piston, means for injecting a portion of the fuel charge at the end of said compression stroke for ignition with the heated compressed primary combustion air part whereby said portion of the injected fuel charge burns at essentially constant volume, means for supplying thereafter highly compressed air to said cylinder while simultaneously therewith injecting the main fuel charge into said cylinder at an essentially constant ratio of highly compressed air to main fuel charge over a larger portion of the following piston stroke during the combustion of said part of the fuel so as to burn the main part of the fuel at essentially constant pressure and at essentially constant temperature, and means for adjusting the output of said engine by varying the degree of filling of said cylinder including speed responsive means driven in proportion to the engine speed for automatically controlling the degree of filling also in dependence on the speed of the engine.

13. An internal combustion engine according to claim 12, wherein said means for adjusting the engine output comprises an actuating member, a control rod for controlling the degree of filling also connected to said lever means, and link means connecting said speed responsive means to said lever means so as to enable adjustment of said control rod with a given position of said actuating member by said speed responsive means.

14. An internal combustion engine with a crankcase and a crankshaft therein comprising working cylinder means and piston means in said working cylinder means, first means including aperture means provided in said working cylinder means for supplying scavenging air to said cylinder means and for compressing a part thereof toward the end of the compression stroke of said piston means so as to provide compressed heated primary combustion air, second means for injecting a portion of the fuel into said heated primary combustion air at the end of said compression stroke to provide burning thereof at an essentially constant volume, third means for injecting into said working cylinder means the main part of the fuel, fourth means including compressor cylinder means and compressor piston means for supplying simultaneously with the injection of said main fuel part highly compressed combustion air to said working cylinder means to provide for the combustion of said main part of the fuel and of said highly compressed air at essentially constant end pressure and constant temperature, said working cylinder means being disposed oppositely to said compressor cylinder means with respect to said crankshaft, and a partition wall separating said crankcase into two crankcase parts in such a manner that each part thereof is provided with at least one of said working cylinder means and one of said compressor cylinder means with the piston means thereof connected to said crankshaft to operate in push-push relationship, each crankcase part being provided with inlet valve means and a line connecting the corresponding crankcase part with some of said aperture means so that said scavenging air is drawn into said crankcase parts through said inlet valve means during the outward compression stroke of the corresponding piston means and is thereupon supplied to the corresponding working cylinder means over the corresponding line and aperture means during the inward stroke of the corresponding piston means.

15. An internal combustion engine with a crankcase divided into two parts by a partition wall comprising at least one working cylinder with aperture means and one piston in said working cylinder for each of said crankcase parts, first means for supplying scavenging air from each one of said crankcase parts to the corresponding working cylinder through said aperture means and for compressing a part thereof toward the end of the compression stroke of the corresponding piston to provide heated primary combustion air, second means for injecting a portion of the fuel into said heated primary combustion air at the end of said compression stroke to provide burning thereof at an essentially constant volume, and third means for simultaneously injecting into said cylinder the main part of the fuel while supplying highly compressed combustion air to provide for the combustion of said main part of the fuel and of said highly compressed air at essentially constant end pressure and constant temperature, said third means including at least one compressor cylinder with a piston therein for each of said two crankcase parts, the pistons of the working cylinder and of the compressor cylinder being disposed opposite each other with respect to the crankshaft and being operatively connected thereto to operate in push-push relationship, said first means including valve means for each crankcase part to enable drawing in of the scavenging air during outward movement of the pistons in the respective crankcase part whereby the thus drawn-in scavenging air is supplied to the corresponding working cylinder over said aperture means during the inward movement of said last-mentioned pistons.

16. An internal combustion engine with an essentially conically shaped combustion chamber comprising at least one working cylinder and one piston in said working cylinder, said combustion chamber being eccentrically disposed with respect to said working cylinder, first means for providing compressed heated primary combustion air toward the end of the compression stroke of said piston, means for injecting a portion of the fuel into said combustion chamber for burning with said heated primary combustion air at the end of said compression stroke to provide burning thereof at an essentially constant volume, means for injection into said combustion chamber the main part of the fuel, and second means for supplying simultaneously with the injection of said main charge highly compressed combustion air to said combustion chamber to provide for the combustion of said main part of the fuel and of said highly compressed air at essentially constant pressure and constant temperature, both of said injection means including a common injection nozzle to inject the fuel into said combustion chamber essentially coaxially therewith, said second means including a discharge orifice located in direct proximity to said nozzle and discharging said highly compressed air essentially tangentially into said combustion chamber.

17. An internal combustion engine according to claim 16, wherein said second means includes an inlet valve to control said discharge orifice and hydraulic means for controlling said inlet valve, said hydraulic means being provided with a cam-operated piston to subject the hydraulic medium to the effect produced by reciprocation of said last-mentioned piston.

18. An internal combustion engine according to claim 17, wherein said second means further includes a further cylinder for said last-mentioned piston provided with a relief port, and a sleeve disposed on the outside of said last-mentioned cylinder to control said relief port.

19. An internal combustion engine according to claim 18, wherein said second means further comprises a lever pivotally guided by the reciprocatory movement of said last-mentioned piston and in abutting engagement at least over a portion of its pivotal movement with said sleeve to thereby impart axial movement to said sleeve, and eccentric means for pivotally supporting said lever and to adjust the position thereof with respect to said sleeve so as to vary the point of abutting engagement of said lever with said sleeve during the pivotal movement of the former.

20. An internal combustion engine according to claim 18, wherein said second means further comprises another cylinder and a line with one-way valve means, connecting said further cylinder with said another cylinder to enable the flow of said hydraulic medium from said further cylinder to said another cylinder but prevent the flow thereof in the opposite direction, a piston connected to said inlet valve in said another cylinder and actuated by said hydraulic medium, a by-pass line by-passing said one-way valve means for the flow of said hydraulic medium in said opposite direction, and a throttling line in parallel with said by-pass line, said by-pass line being valved by said last-mentioned piston in such a way as to close the same during the end of the piston movement thereof so as to force the flow of said hydraulic medium through said throttling line to thereby delay simultaneously the return movement of said last-mentioned piston.

21. A method of operating an internal combustion engine provided with a working cylinder and a piston reciprocating therein, comprising the steps of supplying to the cylinder primary combustion air, compressing at least a part of said primary combustion air during the compression stroke of the piston, whereby the compressed part of said primary combustion air is heated, injecting into the heated, compressed part of the primary combustion air a portion of the fuel charge at the end of the compression stroke of said piston to burn said portion of the fuel charge with said compressed heated primary combustion air at essentially constant volume, and thereafter injecting the main fuel charge into said cylinder while simultaneously therewith supplying to said cylinder highly compressed combustion air over a predetermined portion of the following piston stroke so as to burn said main charge of the fuel with said highly compressed combustion air at essentially constant pressure and constant temperature by maintaining the ratio of said main charge of the fuel to said highly compressed air essentially constant.

22. The method according to claim 21, wherein the output of said internal combustion engine is solely varied by varying the degree of filling while the combustion end pressure in the cylinder is constant with every degree of felling during the combustion at constant volume as well as during the combustion at constant pressure.

23. The method according to claim 21, wherein the output of the engine is varied by varying the moment at which the supply of the main fuel charge and of the highly compressed combustion air is cut off during the expansion stroke of the piston.

24. In an internal combustion engine with a cylinder and a piston therein, a combustion chamber of essentially conical form and disposed eccentrically to the cylinder axis, means disposed coaxially with said combustion chamber for injecting fuel into said combustion chamber, and means located adjacent said last-mentioned means for supplying highly compressed air to said combustion chamber essentially tangentially thereto.

25. In an internal combustion engine the combination according to claim 24, wherein said means for supplying said highly compressed air includes normally closed valve means, and means operated by a fluid medium under pressure for lifting said valve means off the valve seat thereof for predetermined periods of time.

26. In an internal combustion engine the combination according to claim 25, wherein said last-mentioned means includes a piston, means for supplying fluid medium under pressure to said piston and means for delaying the return movement of said piston, said piston being operatively connected with said valve means.

27. In an internal combustion engine the combination according to claim 26, wherein said means for supplying said fluid medium under pressure includes a piston, a cylinder with a relief port for said piston, and means including a sleeve surrounding said last-mentioned cylinder for controlling the moment at which said relief port is opened by said sleeve to thereby relieve the pressure of said fluid medium.

(References on following page)

References Cited in the file of this patent

UNITED STATES PATENTS

| | | |
|---|---|---|
| 1,082,004 | Anthony | Dec. 13, 1913 |
| 1,922,200 | Frank | Aug. 15, 1933 |
| 2,010,469 | Friebnigg | Aug. 6, 1935 |
| 2,076,653 | Ledwinka | Apr. 13, 1937 |
| 2,123,452 | Carrington | July 12, 1938 |
| 2,125,293 | Hesselman | Aug. 2, 1938 |
| 2,454,696 | Highberg | Nov. 23, 1948 |

FOREIGN PATENTS

| | | |
|---|---|---|
| 150,014 | Great Britain | Aug. 26, 1920 |